DESIGN.

R. H. USHER.

DOLL.

APPLICATION FILED MAR. 29, 1921.

Reissued Sept. 6, 1921.

15,188.

2 SHEETS—SHEET 1.

Inventor
Ruth H. Usher.
By Munn & Co.
Attorneys

DESIGN.

R. H. USHER.

DOLL.

APPLICATION FILED MAR. 29, 1921.

Reissued Sept. 6, 1921.

15,188.

2 SHEETS—SHEET 2.

Inventor
Ruth H. Usher.
By Munn & Co.
Attorneys

UNITED STATES PATENT OFFICE.

RUTH H. USHER, OF BROOKLYN, NEW YORK.

DESIGN FOR A DOLL.

15,188. Specification for Reissued Design. Reissued Sept. 6, 1921.

Original No. 57,025, dated January 25, 1921, Serial No. 393,419, filed July 1, 1920, for 3½ years. Application for reissue filed March 29, 1921. Serial No. 456,560. Term of patent 7 years.

*To all whom it may concern:*

Be it known that I, RUTH H. USHER, a citizen of Great Britain, residing at Brooklyn, in the county of Kings and State of New York, have invented a new, original, and ornamental Design for a Doll, of which the following is a specification, reference being had to the accompanying drawing, forming part thereof in which.

Figure 1:
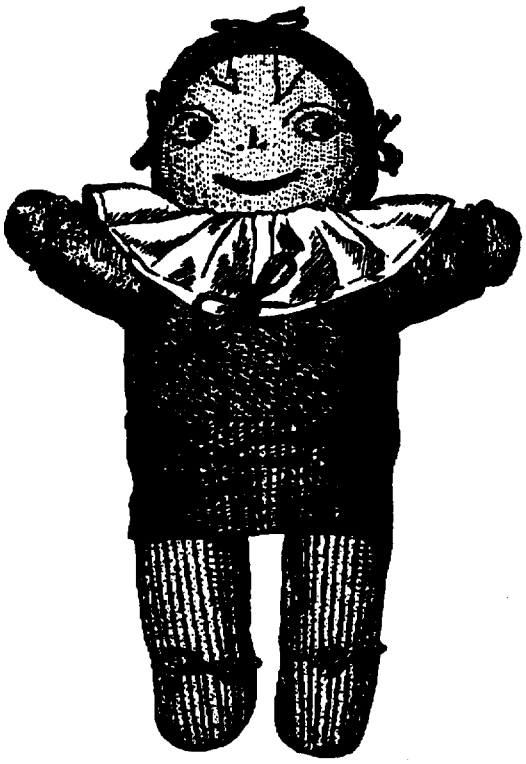
Figure 1 is a front view of the doll.
Figure 2:
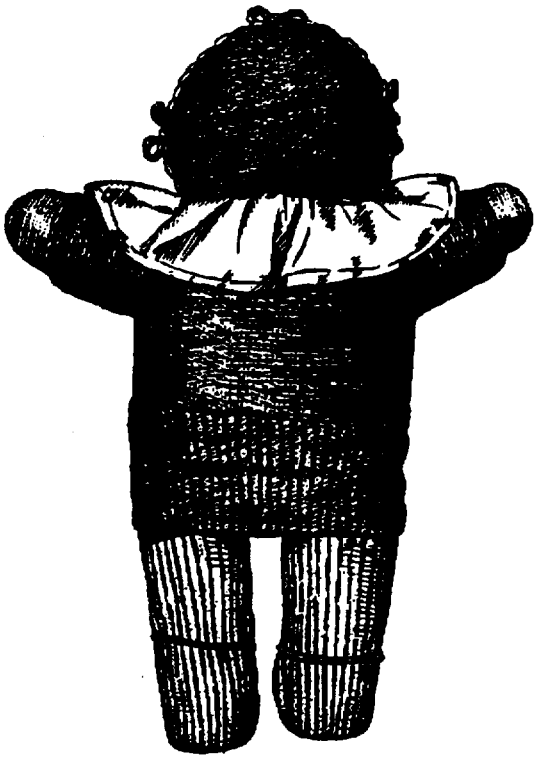
Fig. 2 is a rear view of the same.
Figure 3:
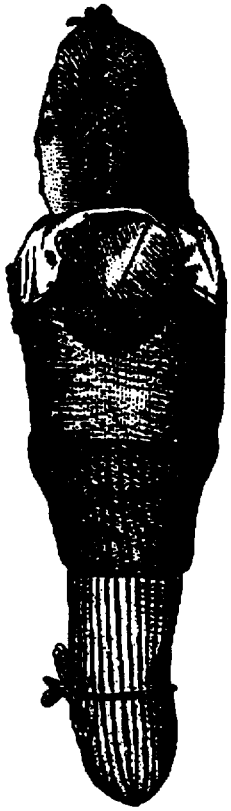
Fig. 3 is a side view thereof.

I claim:

The ornamental design for a doll, substantially as shown.

RUTH H. USHER.